July 8, 1952    R. E. TUTTLE    2,602,369
PHOTOGRAPHIC DEVICE FOR PRODUCING LEGENDS ON NEGATIVES
Filed June 20, 1949
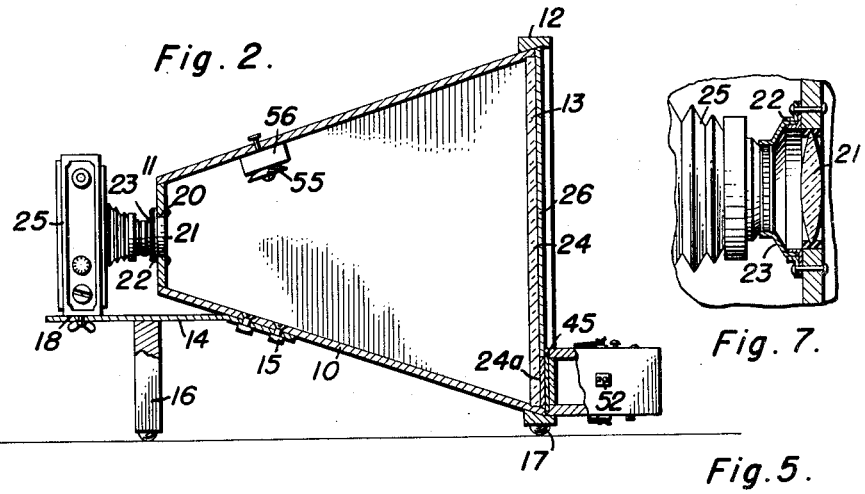
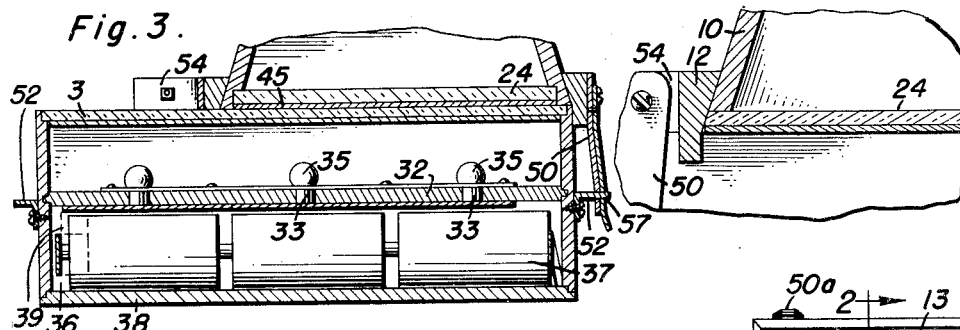
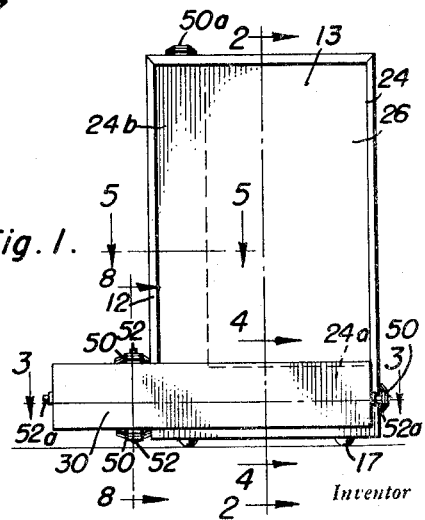
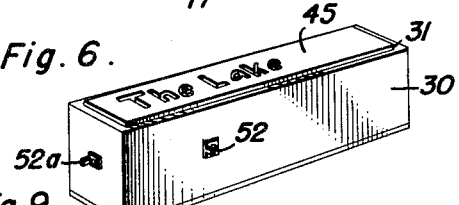
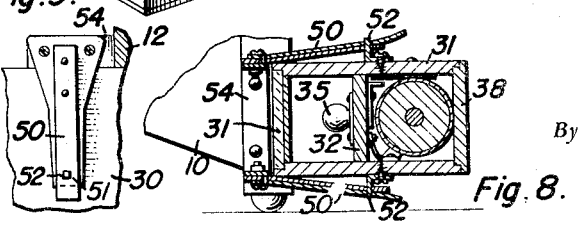
Inventor
Roy E. Tuttle
By Clarence A. O'Brien
and Harvey B. Jacobson
Attorneys Patented July 8, 1952

2,602,369

UNITED STATES PATENT OFFICE 2,602,369

PHOTOGRAPHIC DEVICE FOR PRODUCING LEGENDS ON NEGATIVES

Roy E. Tuttle, Mount Vernon, Wash.

Application June 20, 1949, Serial No. 100,116

2 Claims. (Cl. 88—24)

This invention relates to devices for providing photographic films or plates with descriptive legends, identification marks or the like and it has for its main object to provide a simple and effective device of the above named type adapted for use by the photographic amateur as well as by the professional photographer by means of which typewritten or printed legends or titles shortly describing the nature and location of a picture may be produced on exposed photographic material while still in the camera or in another light tight container by means of a second exposure.

Devices of the general type mentioned which have been proposed previously are mostly numbering or identification devices for professional photographers taking a large number of pictures, or developing a large number of pictures, which devices take, together with a picture of the subject, the picture of an identification mark serving the purpose of identifying the picture with a customer so as to be able to assign and to deliver the picture to the person which is represented on the photo or which made the picture which has been developed. These identification devices, while they place an inscription on the picture, are however not usable for the amateur photographer and for professional work of a certain type in which it is necessary to provide a legend or descriptive title individually connected with each picture of a set or a film.

Apparatus of this type usable for non-professionl photographers have to provide rapidly exchangeable means for producing on each frame of a film or on each plate of a set individually changing prepared legends or titles after the exposure of the films or plate. They nevertheless have to permit a photographic production of legends on a relatively large number of pictures within a relatively short time.

It is therefore a main object of the invention to provide a device for producing continuously changing legends or titles, typed, printed or handwritten, photographically on the frames or divisions of exposed negatives or positives such as the frames of a film, said device permitting a special and second exposure producing the title while protecting the exposed film or plate during said second exposure and said device also permitting to place the descriptive legend or title at a definite selected spot on the picture.

It is a further object of the invention to provide apparatus of the type aforedescribed by means of which the descriptive legend or title may be changed rapidly from picture to picture and in which therefore the exposure device for the production of said descriptive legends or titles consists of two units, one of said units being a closed exposure box with an optical system focussed on a wall of the box which is non-actinic with the exception of a transparent marginal strip, the second unit consisting of a projector box applied against said marginal strip and comprising a closed box with a transparent closure plate or wall which contains illumination means behind said transparent wall adapted to illuminate a legend or inscription consisting of transparency on a more or less opaque sheet which has been placed on said transparent closure plate.

It is a further object of the invention to provide a device of the aforesaid description in which the transparencies forming the typewritten or handwritten legends or titles are obtained by typing or writing on a stencil sheet placed in front of the transparent closure plate of the projector box, said box, carrying the said stencil sheet, being applied against one of the marginal open or transparent portions of the exposure box.

It is a further object of the invention to provide a device of the aforesaid description in which the exposure box which is provided with an optical system focussed in one end wall of the said box, is adapted to be joined to a camera or to another film container in a light tight manner, the optical system of the said exposure box and that of the camera combining in order to focus the picture displayed on the end wall of the exposure box in the focal plane of the camera on the film, said end wall presenting a non-actinic surface and a marginal open or transparent strip near the edge which is covered by the projector box.

It is a further object of the invention to provide a device of the aforesaid description in which the light projecting box may be applied alternatively to one of two open transparent strips or portions which are provided on the end wall of the exposure box, one of the said open passages or transparent strips being however covered with a non-actinic sheet while the second exposure is made through the other open portion or transparent strip, this arrangement serving the purpose to place the legend or title always on a selected spot on the picture irrespective of the fact whether the long or the short side of the picture is parallel to the horizon.

Further and more specific objects will be apparent from the following detailed specification.

The invention is illustrated in the accompanying drawing showing one embodiment thereof.

It is however to be understood that the device shown in the drawing is illustrated by way of example only, the example shown having the purpose of serving as a base for explaining the principle of the invention and the best mode of applying said principle. It will be manifest to the expert skilled in this art that the above named principle may also be embodied in structures differing from the structures shown and modifications of the embodiment shown are therefore not necessarily departures from the invention.

In the accompanying drawing:

Figure 1 is an elevational end view of the device with the projection box applied to one of the marginal strips.

Figure 2 is an elevational sectional view of the device, the section being taken along line 2—2 of Figure 1.

Figure 3 is a sectional plan view on an enlarged scale the section being taken along line 3—3 of Figure 1.

Figure 4 is an elevational sectional view on an enlarged scale the section being taken along line 4—4 of Figure 1.

Figure 5 is a sectional plan view on an enlarged scale of part of the device, the section being taken along line 5—5 of Figure 1.

Figure 6 is a perspective view of the projection box.

Figure 7 is a partly sectional elevational view on an enlarged scale of end of the exposure box joined to the camera, the section being taken along line 2—2 of Figure 1.

Figure 8 is a sectional elevational view of the projection box held against the exposure box, the section being taken along line 8—8 of Figure 1.

Figure 9 is a plan view of the holding device attached to the projection box on an enlarged scale.

As will be clear from the foregoing statements the invention consists in a device for providing descriptive legends or titles for pictures which have been made on films or plates, preferably after said films or plates have been exposed. It is of course necessary to keep a record of the exposures which have been made in order to be able to provide each of the exposed pictures with a correct title or legend. The device is however especially suitable in the event that it is intended to place typewritten or handwritten legends or titles on the individual pictures of an entire series, such as is for instance provided by the picture frames of a film.

The film, the pictures of which have to be provided with titles or legends, may either be in a camera or may be placed into the camera. According to the type of camera used, the film is either rewound or it is held in the magazine or cartridge of the camera into which it was returned after all exposures were made. The camera is then placed before an exposure box having an optical system which, in conjunction with the optical system of the camera, projects a well defined picture appearing on one end wall of the said exposure box on the film in the camera when the latter is exposed for a second time.

It will be clear that this second exposure is only made in order to add the title or legend on a portion of the picture on the film which has already been exposed and which has a definite location on said picture, for instance near the lower margin of said picture, while the remainder of the exposed area must remain unaffected.

In order to produce a descriptive title or legend the characters forming the same must be illuminated on a dark surface and this illumination is produced by a special light box or projection box covered by a practically non-transparent sheet on a transparent closure plate of the box on which the characters are formed in such a way that light may pass through them. When the box is illuminated behind the character carrying sheet a picture of the said illuminated characters will be formed on the already exposed picture on the film. In order to be focussed correctly the surface carrying the sheet with the characters must form the object focussed in the optical system while the film or plate in the camera must be in the focal picture plane.

The second exposure of the film in the exposure box must moreover be confined to a narrow strip containing the characters of the legend or inscription and, as a rule, covering between one to three lines, while the remainder of the surface facing the exposed film while the second exposure is made must be non-actinic in order not to produce an effect on the exposed film. The light or projector box or apparatus which carries the legends must permit a rapid exchange of the title or legend and is therefore preferably removable from the exposure box in order to enable the operator to effect a change of the sheet or strip carrying the legend rapidly and without difficulty.

It will be clear that the character bearing sheet must be so placed that it is the object focussed by the optical system so as to obtain well defined photographically reproduced characters forming the legend on the exposed films.

The device according to the invention therefore consists of an exposure box 10 which, preferably, has the shape of a truncated pyramid which is provided with parallel end walls 11 and 13. The end wall 13 may be held within a reinforcing frame 12. The exposure box may consist of any suitable material shutting off the light, but the two walls may also be connected for instance by means of the usual leather bellows which are used in cameras and enlargers, if adjustments for different sizes is preferable, and the end plates or frames are sufficiently rigid and strong. In the drawing the said box is shown as a wooden box 10 to which a table 14 is fastened by means of screw bolts 15, the said table being provided with a leg member 16. The frame 12 may carry further legs or feet 17 at its lower edge.

The table 14 is provided with a hole or slot 18 through which the well known screw bolt with a disk and a winged nut passes by means of which the camera 25 may be fixed on the table in the manner in which the camera is fixed on a tripod.

The end plate 11 is provided with an aperture 20 carrying a lens system 21. Moreover a double metal sleeve 22 may be arranged on the end piece surrounding the aperture and projecting outwardly. An adapter ring and sleeve 23 which may be fastened to the camera or slipped onto the camera objective mount may cooperate with said double sleeve 22 so as to form a light tight connection between the camera objective and the exposure box, as shown in Figure 7. With some camera types a simple ring or sleeve projecting from the end wall 11 and entering a recess provided in many objective mounts may be used. It will be understood that in this way the exposure box 10 is joined to the camera in such a manner that both form a photographic unit for the purpose of printing the legend photographically.

The exposure box may be adjusted for a certain type of camera and it may then be provided with a fixed lens system 21 so adjusted that it cooperates with the objective of the said camera. For instance, when the camera objective is set for an infinite distance, the inner surface of the wall 13 will be focussed on the film.

The wall 13 is preferably oblong and it may either consist of a plywood plate or, as shown, of a transparent glass plate 24 which is covered on the outer side with black paper, black cardboard or any other sheet or plate of opaque material. When made of plywood a slot is left which is filled by a slide.

Near one of the edges a strip 24a on the transparent glass plate 24 is uncovered and remains transparent. This strip may be located near one of the shorter or near one of the longer edges; different glass plates or plywood boards may be used and may be inserted into the frame 12 or, alternatively, the glass plates may be fixedly mounted and may be provided with the backing 26 of cardboard, plywood or masking paper which leaves a strip 24b near the longer edge and a further strip 24a on the shorter edge uncovered. According to the place at which the legend has to be located with respect to the picture, one of these strips has to be covered separately by the operator by means of a suitable strip of black cardboard, heavy black paper, plywood or the like which may be fixed by adhesive tape, small metal prongs which are pivoted on the cardboard or by similar means.

The light or projection box 30 is a separate unit which is applied against the plate 24 and which consists, as seen in Figure 4, of a wooden box, closed on all sides, but open on the front side on which it is covered by a transparent closure plate 31. The box is provided with a partition wall 32 which carries a number of lamp sockets 33 into which light bulbs 35 have been inserted. Behind the partition wall 32 a compartment 36 is formed which may contain dry cells 37 forming a source of current for the light bulbs or a bell transformer (not shown). The outer wall 38 of the box 30 is preferably hinged or removably held on the box in order to be able to inspect and remove the dry cells 37. A connection between the dry cells 37 and the socket is made by contact strips 39 which lead to a push button switch 40 provided with a push rod 41 projecting outwardly. The lamp bulbs may thus be operated by pressing the button 41.

The box 30 is preferably the length of the larger side of the frame 12 and may be applied either against the transparent strip 24b on the longer side of the frame or against the transparent strip 24a on one of the shorter sides of the frame.

The inscription for the legend or title is preferably prepared by typing it on a wax stencil sheet 45 which may be applied against the outer surface of the closure plate 31 of glass or other suitable material and which will adhere on this plate on account of the wax covering. If the light box or projection box 30 is constructed for a plurality of typed lines or if the entire width of the box is not utilized a black mask 46 may preferably be applied on the inside of the glass plate 31.

If the legends or titles are to be applied to colored photos it is usually necessary to color the light projected through the stencil, so as to produce a suitable contrast between the colors of the picture and the color with which the legend is printed. When the legends are applied to the lower part of the picture which are usually more or less dark brown or green it is preferable to use red, yellow or blue colors in order to produce a clearly legible inscription. Legends applied at other places, for instance legends applied along the upper margin must be colored in accordance with the prevailing color on these spots.

The customary stencil sheets are themselves colored and care has to be taken that the color selected is completely or nearly complementary to the color of the stencil sheet so that the latter will appear to be black.

The box 30 may be held alongside the projection box 10 by any appropriate means; for instance it may be simply placed alongside the projection box on a table and provided with suitable projections fitting into holes to secure correct position.

However in order to avoid the necessity of turning the exposure box in order to keep the projection box on a table or other support and in order to exclude faulty manipulation it is preferable to attach the projection box 30 to the exposure box 10 by some suitable detachable fixation means, such as spring pressed clips or prongs 50 mounted on the projection box and provided with holes 51 which engage protuberances or projections 52 of the exposure box 30. The location of the fixation prongs is shown in Figure 1.

In order to hold the exposure box in the position shown in Figure 1 prongs attached to the side wall of the exposure box by means of a bracket 54 may be used engaging protuberances 52 on the top and bottom of the exposure box. Additionally the end walls of the projection box may be provided with protuberances 52a engaging prongs 50a on the upper and lower wall, in the event that the projection box is held alongside the transparent strip 24b.

The operation will be readily understood from the foregoing description. The photographer must keep a record of the pictures which have been made on a film spool and must have decided what titles are to be applied to them. This record must also show whether the picture has been taken with the short or the long side standing up. He then types the titles on the stencil sheet and, in those cases in which the stencil sheet cannot be used as such, he cuts the stencil sheet into strips which fit the box. The film which was placed into the camera is first reeled back. The camera is then fixed on the table 14 by means of screws 18, the objective is provided with the adapter sleeve 23 which is so placed that it enters between rings 22 so that the camera is in light tight connection with the exposure box 10.

The strip cut from the stencil sheet on which the title has been written is applied against the closure plate 31 where it adheres by virtue of the wax covering without further means when applied with a slight pressure of the hand. The black strip covering the strip 24b is applied and the legend projection box 30 is then secured to the exposure box and held against the transparent portion 24a of plate 24 as shown in Figure 5, if the shorter side of the picture is parallel to the horizontal.

The shutter of the camera may now be opened. When the legend projecting box 30 is in its place the button 41 may be pressed for the desired period of time which is practically always the same. After each title projection the film is advanced, the camera shutter closed and the legend projection box is removed and a new stencil strip 45 is mounted on the closure plate 31.

The operation may proceed very speedily as, after the initial adjustment, only the operations of changing the strip of applying the box and of advancing the film have to be carried out for each exposure.

The result is a print in red or yellow on a dark background such as shown in Figure 6.

The apparatus has been described as being used in a position in which the optical axis of the camera and of the exposure box is in the horizontal position. It is however obvious that the same construction may be used with only obvious modifications when the optical axis of the camera of the exposure box is in a vertical position. In this case the leg members are fastened to a standard which is held on the working table. Such a position has the advantage that the stencil sheet need not be cut, but may be used without being cut and may be advanced so that one title after the other which has been typed on the sheet is in contact with the closure plate 31. The box 10 may be provided with an additional lamp 55 and dry cell battery 56 which is operable separately and which emits light to facilitate adjustment of the stencil strip on the transparent portion 24a or 24b of the glass plate 31 on a dark background. This light is only operated when the shutter of the camera is closed. The light bulb and dry cell are so positioned that they do not interfere with the projection.

Obviously a number of further changes may be made in the construction without departing in any way from the essence of the invention.

Having described the invention, what is claimed as new is:

1. A device for photographically printing legends on sensitized previously exposed picture carriers contained in a conventional camera, provided with an optical system, comprising an exposure box, having two parallel end walls of different area, arranged at a distance, and side walls joining said end walls, all said walls being opaque and provided with inner surfaces substantially excluding the transmission or reflection of actinic rays, said exposure box being completely closed by the side walls and end walls with the exception of an aperture in the smaller end wall adapted to receive the objective of the conventional camera in a light tight manner, and two elongated strip like cuts running along the margin of the larger end wall along two sides at right angles to each other, an optical system within the aperture of the smaller end wall being arranged for cooperation with the optical system of the camera in its normal end position to focus pictures the original of which is arranged in a plane coincident with the second end wall, means for selectively and alternatively covering one of said cuts in the larger end wall with a covering strip, having an inner surface excluding the transmission and reflection of actinic rays, in a light tight manner, a closed legend box with opaque side walls and an opaque back wall, a translucent front wall in said legend box, said box being of a width exceeding the width of the marginal cut and of a length corresponding to the length of the larger marginal cut in the end wall, a substantially opaque stencil sheet provided with impressed transparent legend characters applied against and covering said translucent front wall, electric light bulbs within said closed legend box behind the said translucent front wall, means for energizing the light bulbs, a switch in said projection box for controlling the energization of the electric light bulb and for limiting the duration of the lighting of the lamps, said legend box being applied against the marginal cut of the end wall of the exposure box in a light tight manner for producing a photographic picture of the legend impressed into the stencil sheet on the exposed film carrier in the camera upon energization of the light bulbs in a predetermined marginal zone of the exposed film carrier within the camera without affecting the remainder of the exposed area of the picture carrier focussed on the opaque end wall of the exposure box.

2. A device for photographically printing legends on negatives, according to claim 1, wherein said transparent closure plate of the legend projection box is covered with a colored sheet for coloring the light passing through the stencil sheet.

ROY E. TUTTLE.

REFERENCES CITED

The following references are of record in the file of this patent:

UNITED STATES PATENTS

| Number | Name | Date |
| --- | --- | --- |
| 1,143,522 | Faber | June 15, 1915 |
| 1,801,458 | Satterlee | Apr. 21, 1931 |
| 1,885,555 | Schwartz | Nov. 1, 1932 |
| 2,036,682 | Cantor | Apr. 7, 1936 |
| 2,259,238 | Berhard | Oct. 14, 1941 |
| 2,339,657 | Smith | Jan. 18, 1944 |
| 2,396,874 | Nagel | Mar. 19, 1946 |